Oct. 20, 1925.
J. W. BRUNDAGE
1,558,341
SEAM REENFORCING MACHINE
Filed Dec. 22, 1923   3 Sheets-Sheet 2
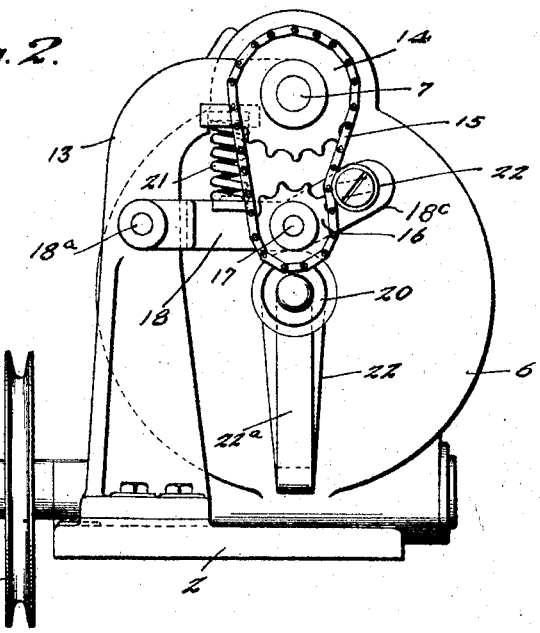
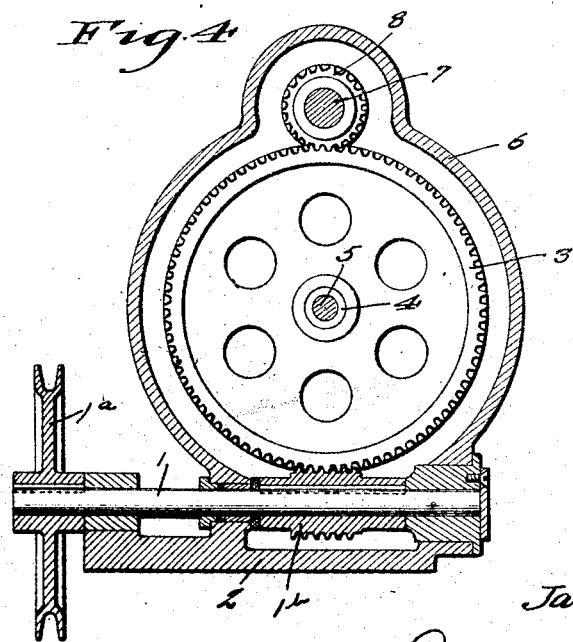
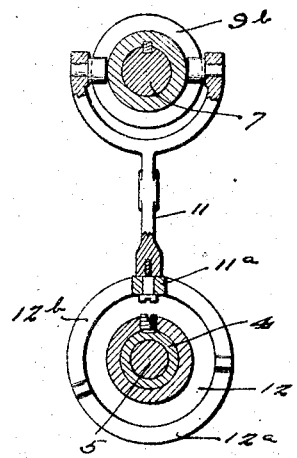
Inventor
James W. Brundage Oct. 20, 1925.
J. W. BRUNDAGE
SEAM REENFORCING MACHINE
Filed Dec. 22, 1923
1,558,341
3 Sheets-Sheet 3
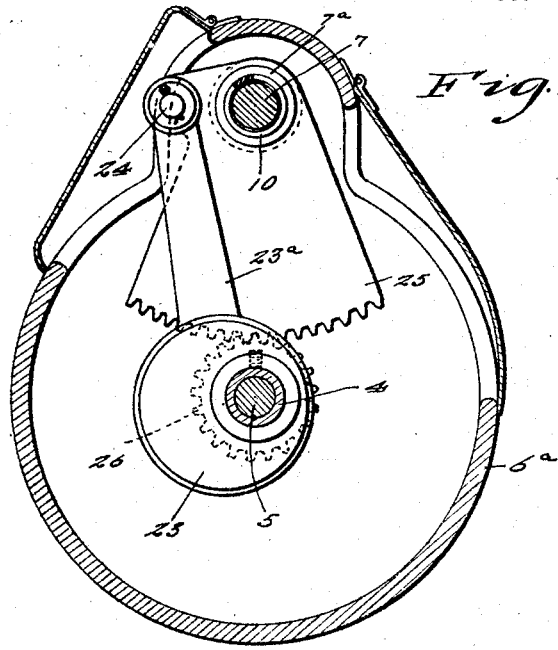
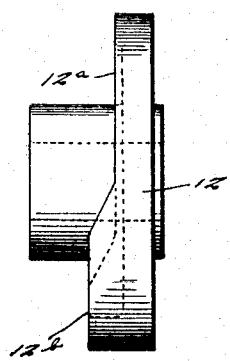
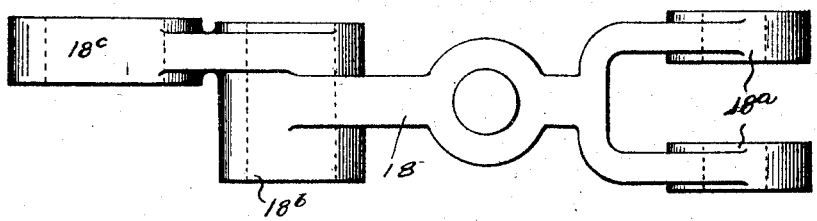
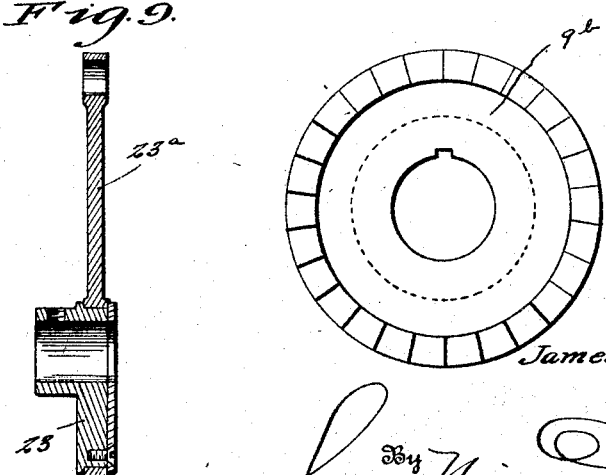
Inventor
James W. Brundage
By Spear, Middleton, Donaldson & Spear
Attorney Patented Oct. 20, 1925.

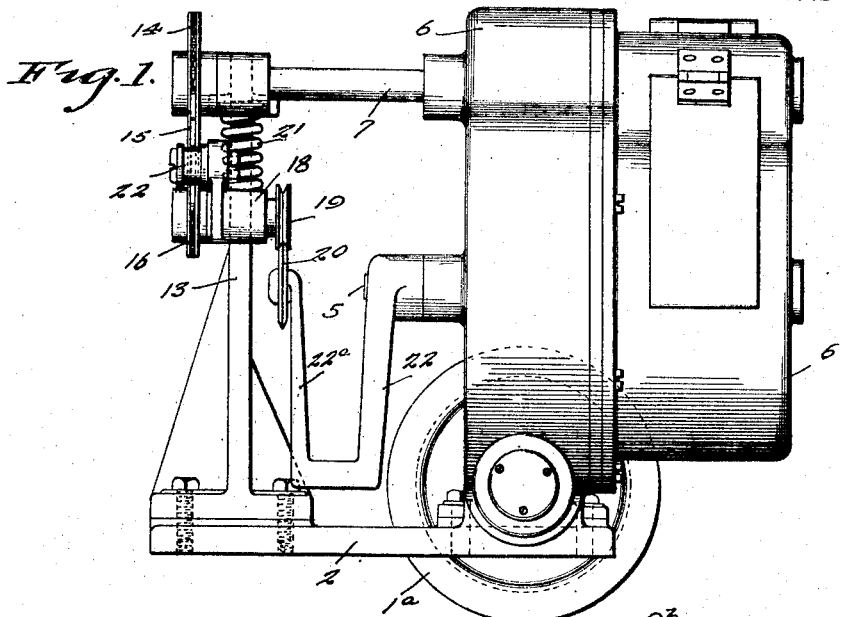

1,558,341

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

SEAM-REENFORCING MACHINE.

Application filed December 22, 1923. Serial No. 682,294.

*To all whom it may concern:*

Be it known that I, JAMES W. BRUNDAGE, a citizen of the United States, and resident of Akron, in the county of Summit and State of Ohio, have invented certain new and useful Improvements in Seam-Reenforcing Machines, of which the following is a specification.

My present invention relates to improvements in machines for reenforcing the seams of articles made of thin sheet rubber in the manner disclosed in Patent No. 1,458,801, dated June 12, 1923, and is designed more particularly for use in the manufacture of bag-like articles or containers, such for example as are used for holding powder puffs and the like.

The invention aims to provide a machine which will be simple, economical and efficient and adapted to support the article in a proper manner during the seaming operation and without injury to or straining of the walls of the bag.

With these and other objects in view, the invention includes the novel features of construction and arrangement and combination of parts hereinafter described and particularly defined by the appended claims.

An embodiment of my invention is illustrated in the accompanying drawings in which:—

Figure 1 is a side elevation of such a seam reenforcing machine.

Fig. 2 is an end view as seen from the left, Fig. 1.

Fig. 3 is a central vertical longitudinal section.

Fig. 4 is a section on line 4—4 of Fig. 3.

Fig. 5 is a section on line 5—5, Fig. 3.

Figs. 6 to 10 inclusive are detail views.

Referring by reference characters to these drawings, the numeral 1 designates the drive or operating shaft journaled in suitable bearings in the base 2 of the machine, and carrying means by which it may be driven from any suitable prime mover (not shown) such as belt pulley 1ª. This shaft 1 carries a worm 1ᵇ which meshes with a worm or spiral gear 3 fast on a sleeve or quill shaft 4 which encloses a main shaft 5, sleeve 4 and shaft 5 being rotatably supported by the walls of the frame or housing 6 supported by the base 2, the housing being preferably made in two parts (designated 6 and 6ª respectively) for convenience of assembly, part 6 being bolted to the base and part 6ª to part 6.

Journaled in the upper part of the housing is a shaft 7 which is designed to operate the seaming roll in the manner hereinafter described, this shaft having loose thereon within the housing, a gear 8 which meshes with gear 3 above described. Gear 8 has fast thereon a clutch part 9ª which is adapted to be engaged by a coacting clutch part 9ᵇ splined on the shaft and operated so as to automatically couple the gear to and uncouple it from the shaft at suitable intervals. My preferred manner of doing this is to provide a spring 10 encircling the shaft between clutch member 9ᵇ and a fixed abutment 7ª on the shaft, which spring tends normally to press the movable clutch member into clutching position, movement of the clutch member 9ᵇ in the opposite direction being effected by a shifter lever 11 having a suitable fork engaging an annular groove in the clutch member. The lever 11 has an intermediate portion fulcrumed upon a bracket 6ᵇ carried by the casing and its lower end is provided with an anti-friction roller 11ª designed to coact with a cam 12 fast on the sleeve or quill shaft 4 and having high and low faces 12ª and 12ᵇ (see Fig. 7) respectively, each of which extends approximately 180° of the circumference of the cam.

From this it will be seen that shaft 7 will be driven intermittently with proper intervals between the periods of rotation, which with the cam described will be of equal duration, though the relation of the drive period to that of rest may be varied according to the character of work by merely varying the respective areas of high and low parts of the cam.

The outer end of shaft 7 is journaled in the overhanging end of a standard or bracket 13 supported from the base 2 and carries a sprocket 14 fast thereon which is geared by means of link belt 15 to sprocket 16 fast on shaft 17 journaled in the bearing portion 18ᵇ of an arm 18 (see Figs. 1 and 8) having a bifurcated portion fulcrumed at 18ª on the standard or bracket 13. The shaft 17 carries the seaming roller 19 which has a V-shaped peripheral groove and is designed to coact with the seam supporting roller 20 mounted to rotate about a fixed axis. The arm 18 is acted upon by a compression spring 21 which causes the roller 19 to be pressed into contact with the supporting roller 20 with the required pressure to effect the seaming operation. A chain slack take-up may be provided in the shape of a roller 22 carried by the projecting portion 18° of arm or lever 18.

These powder puff containers are of bag or pocket shape with a contracted mouth and it is necessary to support the roller 20 in such a way that the supporting means will not interfere with the walls or mouth of the bag or container. To accomplish this I journal the roller 20 upon one of the arms of a U-shaped member 22, the other arm of which is fast on the projecting end of the shaft 5 hereinbefore described. The U-shaped portion of the bracket or the space between the arms is of a depth equal to or greater than the length of the container to be seamed, which permits the container to pass down or envelop the supporting wheel 20 and arm 22ª as the bottom of the container is approached and reached. It will be understood that the seaming of one side of the bag is started with the arm 22ª in substantially horizontal position. As the seaming rollers, drawing the seam between them, approach the bottom of the bag, it is necessary that the arm 22ª shall be swung downward until, as the bite of the rollers reach the center of the bottom of the bag or container, the arm 22ª will be vertical, the reverse operation taking place as the rollers seam the opposite side of the bag.

To cause this arm to thus move in synchronism with the action of the seaming rollers, I provide the following described mechanism.

The sleeve or quill shaft 4 has fast thereon an eccentric 23 which is connected by a strap and eccentric arm 23ª (see Fig. 5) with a pin 24 fast on a gear segment 25 articulated on a fixed pivot which may conveniently be the shaft 7. Gear segment 25, the teeth of which act as a rack, meshes with a gear 26 fast on shaft 5 and it will thus be seen that as the quill shaft rotates the gear segment 25 will be oscillated by the eccentric 23 and will impart an oscillating movement to the shaft 5 and U-shaped support 22 through an arc of 180°, the mechanism being so timed that with the arm 22ª in horizontal position, as above described, at the time when the roller 19 begins its drive, the arm 22ª will swing to vertical position and on to reverse horizontal by the time the roller 19 again comes to rest, this representing the period in which the rollers are acting on the seam running from one edge of the back around the bottom and back to the other edge.

It will be understood that at the beginning of the seaming operation the arm 22ª would be in horizontal position pointing towards the operator, at which time the edge of the seam is started between the seaming rollers. As the rollers travel over the seam and draw the container onto the arm, the said arm gradually swings around until, when the rollers reach the opposite edge and the bag is complete, the carrying arm points away from the operator and delivers the completely seamed bag. At this time the drive of the pressing roller is interrupted and during its idle period the supporting arm 22ª swings back to its original position ready to begin operation on a fresh bag or container.

Having thus described my invention, what I claim is:

1. In a machine of the class described, a supporting roller journaled to rotate about a fixed axis, a pressing roller cooperating therewith, a supporting arm on one end of which said supporting roller is journaled extending substantially perpendicular to said axis, and means for supporting the other end of said arm and swinging it in a path concentric to said axis.

2. In a machine of the class described, a supporting roller journaled to rotate about a fixed axis, a pressing roller cooperating therewith, means for rotating said pressing roller intermittently, an elongated member lying in a plane perpendicular to said axis and on one end of which said supporting roller is journaled, and means for oscillating said arm in said plane in unison with the rotation periods of said pressing roller.

3. In a machine of the class described, an oscillatory member, an arm having its outer end supported by said oscillatory member, a supporting roller journaled on said arm to rotate about an axis substantially coincident with the axis of said outer end of said arm, a presser roller coacting with said supporting roller and means for driving one of said rollers.

4. In combination, a suitable support, a shaft journaled therein, a substantially U-shaped member carried thereby, a supporting roller journaled on the free arm of said member substantially in line with the axis of the shaft, a presser roller coacting with said supporting roller, means for intermittently rotating said presser roller, and means for intermittently oscillating said shaft in synchronism therewith.

5. In combination, a suitable support, a shaft journaled therein, a member carried by said shaft including an arm having an end spaced from but axially alined with said shaft, a sleeve encircling said shaft, means for rotating said sleeve, a second shaft journaled in said support parallel with said first named shaft, means for intermittently driving said second shaft from said first named sleeve, means controlled by the rotation of said sleeve for causing said second shaft to oscillate said first named shaft, work supporting means carried by the first named shaft, and a pressing roller actuated by said second shaft.

6. In combination, a main frame, a main shaft rotatably carried thereby, a transversely disposed work supporting arm carried by said shaft having a free end spaced from said shaft, a work supporting roller journaled on said free end and having its axis substantially in line with the axis of the shaft, a counter shaft journaled in said frame, a presser roller cooperating with said work supporting roller, means whereby said counter shaft rotates said presser roller, a sleeve on said main shaft, a gear fast on said sleeve with means for driving it, a gear loosely mounted on said counter shaft, clutch means for connecting said gear with the counter shaft, and cam operated means controlled by the rotation of said sleeve for actuating said clutch for intermittently driving said shaft.

7. In combination, a main frame, a main shaft rotatably carried thereby, a transversely disposed work supporting arm carried by said shaft having a free end spaced from said shaft, a work supporting roller journaled on said free end and having its axis substantially in line with the axis of the shaft, a counter shaft journaled in said frame, a presser roller cooperating with said work supporting roller, means whereby said counter shaft rotates said presser roller, a sleeve on said main shaft, means for rotating said sleeve, means for causing the rotation of said sleeve to intermittently rotate said counter shaft, a gear fast on said main shaft, a gear segment pivoted to oscillate about a fixed axis and meshing with said gear, and eccentric means whereby the rotation of said sleeve oscillates said gear segment.

8. In combination, a main frame, a main shaft rotatably carried thereby, a transversely disposed work supporting arm carried by said shaft having a free end spaced from said shaft, a work supporting roller journaled on said free end and having its axis substantially in line with the axis of the shaft, a counter shaft journaled in said frame, a presser roller cooperating with said work supporting roller, means whereby said counter shaft rotates said presser roller, a sleeve on said main shaft, means for rotating said sleeve, means for causing the rotation of said sleeve to intermittently rotate said counter shaft, a gear fast on said main shaft, a gear segment articulated on said counter shaft and meshing with said gear, an eccentric on said sleeve, and an eccentric strap and connecting rod connecting said eccentric with said gear segment at one side of its pivot.

9. In combination, a main frame, a main shaft journaled therein, a cranked work supporting arm carried by said shaft, a work supporting roller journaled on said arm, a sleeve on said shaft, a worm gear fast on said sleeve, a worm meshing with said worm wheel with means for driving it, a counter shaft journaled in said main frame, a gear loose on said counter shaft and meshing with said worm gear, means controlled by the rotation of said sleeve for intermittently clutching said gear to said counter shaft, a presser roll cooperating with said work supporting roller, means for driving said presser roller from said counter shaft, and means for oscillating said main shaft in unison with the rotation of said counter shaft.

10. In combination, a main frame, a main shaft journaled therein, a cranked work supporting arm carried by said shaft, a work supporting roller journaled on said arm, a sleeve on said shaft, a worm gear fast on said sleeve, a worm meshing with said worm wheel with means for driving it, a counter shaft journaled in said main frame, a gear loose on said counter shaft and meshing with said worm gear, means controlled by the rotation of said sleeve for intermittently clutching said gear to said counter shaft, a presser roll cooperating with said work supporting roller, means for driving said presser roller from said counter shaft, a gear on said main shaft, a movably mounted gear member meshing therewith, an eccentric on said sleeve, and means whereby said eccentric imparts movement to said gear member.

11. In combination, a main shaft, a work supporting arm carried thereby having a transversely disposed arm with a free end spaced from the end of the shaft, a work supporting roller journaled on said free end with its axis substantially in alinement with the shaft axis, a presser roll cooperating with said work supporting roll, an arm articulated to a fixed support and carrying said presser roll, a spring urging said presser roll towards the work supporting roll, a counter shaft, driving means between said presser roll and counter shaft, means for intermittently rotating said counter shaft, and means for oscillating said main shaft coincidently with the rotation of the counter shaft.

In testimony whereof, I affix my signature.

JAMES W. BRUNDAGE.